(12) United States Patent
Sasaki et al.

(10) Patent No.: US 11,385,337 B2
(45) Date of Patent: Jul. 12, 2022

(54) METHOD FOR CALIBRATING MEASURING ELEMENT, METHOD FOR EVALUATING ROAD SURFACE PROPERTIES, AND APPARATUS FOR EVALUATING ROAD SURFACE PROPERTIES

(71) Applicant: Topcon Corporation, Tokyo (JP)

(72) Inventors: You Sasaki, Tokyo (JP); Tadayuki Ito, Tokyo (JP)

(73) Assignee: Topcon Corporation, Tokyo (JP)

( * ) Notice: Subject to any disclaimer, the term of this patent is extended or adjusted under 35 U.S.C. 154(b) by 512 days.

(21) Appl. No.: 15/850,212

(22) Filed: Dec. 21, 2017

(65) Prior Publication Data

US 2018/0321364 A1 Nov. 8, 2018

(30) Foreign Application Priority Data

Mar. 1, 2017 (JP) .............................. JP2017-038532

(51) Int. Cl.
| | |
|---|---|
| *G01S 7/48* | (2006.01) |
| *G01S 7/497* | (2006.01) |
| *G01S 17/89* | (2020.01) |
| *G01B 11/24* | (2006.01) |
| *G01S 17/42* | (2006.01) |
| *G01S 7/481* | (2006.01) |

(52) U.S. Cl.
CPC ............. *G01S 7/497* (2013.01); *G01B 11/24* (2013.01); *G01S 17/42* (2013.01); *G01S 17/89* (2013.01); *G01S 7/4815* (2013.01)

(58) Field of Classification Search
None
See application file for complete search history.

(56) References Cited

U.S. PATENT DOCUMENTS

| 9,290,894 | B2* | 3/2016 | Eul ..................... E01C 19/48 |
| 2004/0170315 | A1* | 9/2004 | Kosaka ................ G06T 5/006 |
| | | | 382/154 |
| 2015/0120244 | A1* | 4/2015 | Ma ...................... G01S 17/89 |
| | | | 702/172 |

FOREIGN PATENT DOCUMENTS

JP H10-288516 A 10/1998

OTHER PUBLICATIONS

Gilbert "Camera Pose Estimation From a Stereo Setup", Feb. 2005, https://citeseerx.ist.psu.edu/viewdoc/download?doi=10.1.1.421.2129&rep=rep1&type=pdf (Year: 2005).*

* cited by examiner

*Primary Examiner* — Hovhannes Baghdasaryan
(74) *Attorney, Agent, or Firm* — Chiesa Shahinian & Giantomasi PC

(57) ABSTRACT

A method for calibrating unevenness of a plurality of measuring elements in an apparatus for evaluating road surface property having a plurality of measuring elements repeats steps of computing separation quantities from a calibration reference plane on a reference area regarding all measuring elements; determining a measuring element where the separation quantity is maximum from among all the measuring element to calibrate the measuring element such that a difference between point cloud data produced from a measurement value of the measuring element where the separation quantity is maximum and the calibration reference plane becomes equal or less than a predetermined value, producing a new calibration reference plane from the measurement values of the measuring elements including the calibrated measuring element, until RMS of point cloud data does not change.

20 Claims, 14 Drawing Sheets

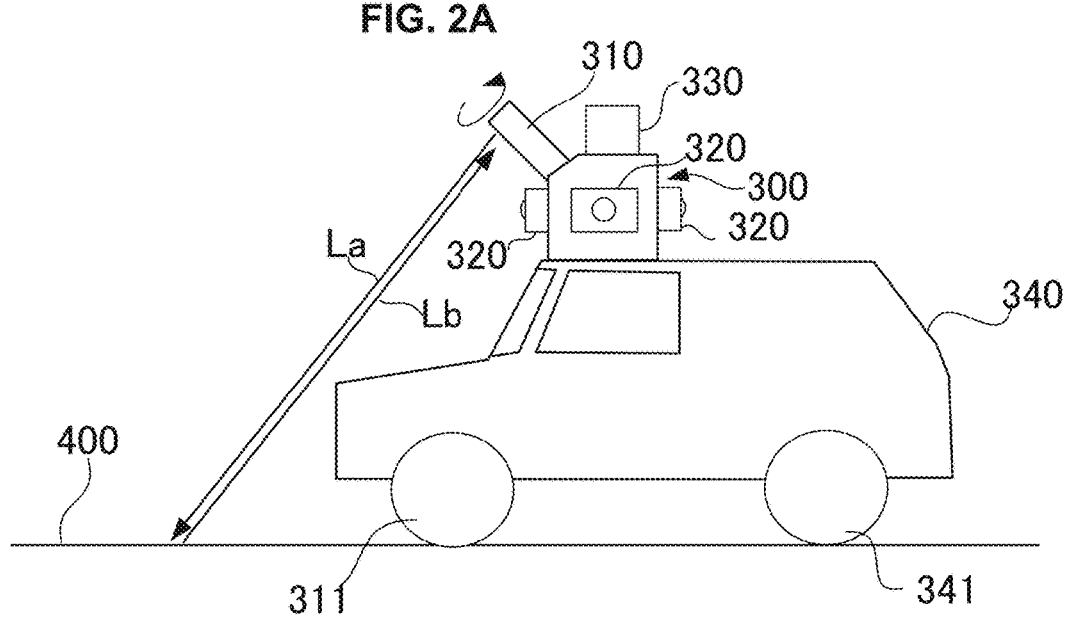
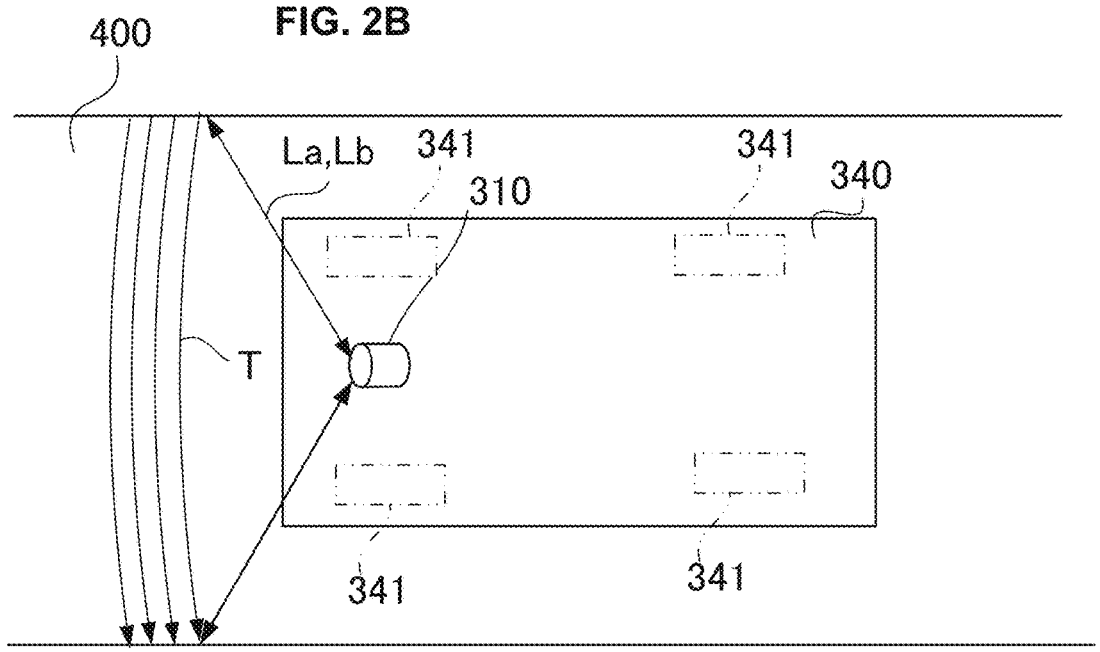

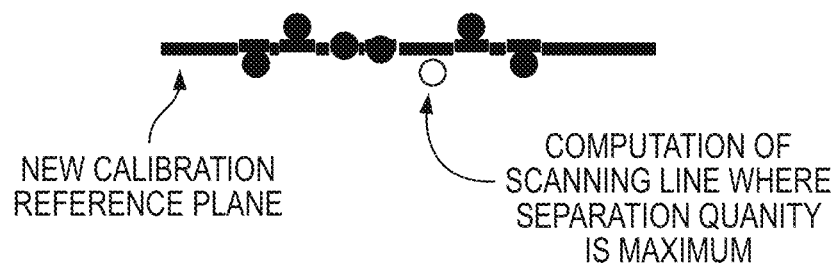
NEW CALIBRATION REFERENCE PLANE
COMPUTATION OF SCANNING LINE WHERE SEPARATION QUANITY IS MAXIMUM
FIG. 12D
OFFSET
FIG. 12E
COMPUTATION OFFSET QUANITY OF EACH SCANNING LINE BY REPEATING ABOVE-DESCRIBED STEPS
FIG. 12F

METHOD FOR CALIBRATING MEASURING ELEMENT, METHOD FOR EVALUATING ROAD SURFACE PROPERTIES, AND APPARATUS FOR EVALUATING ROAD SURFACE PROPERTIES

CROSS-REFERENCE TO RELATED APPLICATION

This application is based upon and claims the benefit of priority from Japanese Patent Application No. 2017-038532, filed Mar. 1, 2017, the entire contents of which are incorporated herein by reference.

TECHNICAL FIELD

The present invention relates to a method for calibrating a measuring element, a method for evaluating road surface properties, and an apparatus for evaluating road surface properties.

BACKGROUND

Generally, a rut or roughness occurs on a road over time due to passages of vehicles or the like and they must be repaired. In order to perform repair of such a road, the road is inspected and data about road surface properties of the road, namely, data on a state of roughness of the road surface is acquired. The data about these road surface properties is acquired by measurement performed by a measuring person or causing road surface inspection car to run along a measurement route of a road to be measured. The road surface inspection car is equipped with a measuring apparatus for measuring a height of each point on a road surface by irradiating the road surface with scanning light.

Japanese Patent Application Laid-Open No. H10-288516 describes the following technique. An apparatus for projecting light on to a flat surface while moving a moving body in a longitudinal direction of the flat surface and measuring a difference in level of the flat surface based upon the result of the light projection is configured so as to include a means for detecting a movement distance and light projecting means, means for imaging a light irradiation line, a traversing-direction data computing means for acquiring height data, a longitudinal-direction data computing means, and a three-dimensional data computing means. According to the above configuration, light is projected from the moving body on to flat surface such that one irradiation line is formed on the flat surface along the traversing direction of the flat surface for each of predetermined distances of the moving body, so that a roughness profile is acquired in real time by the above-described respective means.

By such a road surface inspection car, height measurement of a road surface is performed by performing irradiation of scanning light in a spiral manner diagonally in front of the vehicle by a scanner of a measuring apparatus while acquiring the position through a GNSS (Global Navigation Satellite System) to reception of reflected light from the road.

Here, the measuring apparatus is provided with a plurality of measuring elements, and a distance to the road surface is acquired by rotationally driving the measuring elements to perform sequential scanning. The measuring elements in such a measuring apparatus are subjected to calibration at the manufacturing time of the measuring apparatus, such that variation of measurement values of all sensors is set to fall within a predetermined threshold, for example, within 1 cm. However, according to the degree of calibration of the sensors, the measurement value of the road surface varies for each measuring element. In addition, the measurement values drift as time elapses to a temperature change or the like, so that accurate measurement of the road surface properties cannot be performed by the calibration preliminarily performed.

In order to deal with this problem, a process for smoothing point cloud data on the road surface obtained by performing actual measurement to make the data smooth is performed. However, since the process is performed based upon many point clouds, though no problem occurs when the process is applied to only to a flat road surface it is difficult to perform the process on the basis of a road surface having another shape or a complicated road surface. Further, it is necessary to process the measured data over the whole range, which results in the problem of increase in computing time or computing cost.

BRIEF SUMMARY OF THE EMBODIMENTS

In view of the above-described problem, the present invention has been made, and an object thereof is to provide a method for calibrating a measuring element which can acquire calibration values for calibrating the variation of measurements of a plurality of measuring elements rapidly according to a simple process, and an apparatus for evaluating road surface properties.

According to a first aspect of the present invention for solving the above problem, there is provided a method for calibrating unevenness of a plurality of measuring elements in an apparatus for evaluating road surface properties, the apparatus being provided with the plurality of measuring elements for emitting measuring light and receiving reflected light, the apparatus performing evaluation by scanning road surface with the plurality of measuring elements and measuring a separation quantity from a reference plane of the road surface while being moved along a measurement route of the road surface, the method determining a final calibration value of each of the measuring elements by performing the steps of:

setting a reference area for performing the calibration and provisional reference plane of the reference area;

acquiring a measurement value obtained by each of the measuring elements regarding the reference area; and producing point cloud data on separation quantity of the each point from the provisional reference plane of the reference area in the reference area and subsequently, until separation quantities form the reference plane for calibration of the point cloud data obtained by all the measuring elements become smaller than a predetermined reference value, repeating steps of:

computing the separation quantities form the reference plane for calibration based upon the statistic regarding all of the measuring elements;

determining a measuring element where the separation quantity is maximum from among all of the measuring elements, and determining a calibration value of the measuring element such that a difference between point cloud data produced form the measurement value of the measuring element where the separation quantity is maximum and reference plane for calibration is equal to or less than a predetermined threshold; and producing a new reference plane for calibration form the measurement values of all of the measuring elements including the measuring element calibrated.

Similarly, according to a second aspect of the present invention, there is provided the method for calibrating unevenness of a plurality of measuring elements in an apparatus for evaluating road surface properties according to the first aspect, wherein, when the provisional reference plane of the reference area is set, it is confirmed that a separation quantity at each measuring point from a fitting plane produced from measurement values acquired in the reference area measured by one measuring element selected from the plurality of measuring elements is smaller than a predetermined specified value.

Similarly, according to a third aspect of the present invention, there is provided the method for calibrating unevenness of a plurality of measuring elements in an apparatus for evaluating road surface properties according to first or second aspect, wherein the reference area is set at a specified place in the measurement route of the road surface to be measured.

Similarly, according to a fourth aspect, of the present invention there is provided the method for calibrating unevenness of a plurality of measuring elements in the apparatus for evaluating road surface properties according to any one of the first to third aspect, wherein the reference area is set at least one of a place corresponding to a starting position of the measurement route and a place corresponding to a terminating position thereof.

Similarly, according to a fifth aspect of the present invention, there is provided the method for calibrating unevenness of a plurality of measuring elements in the apparatus for evaluating road surface properties according to the fourth aspect, wherein the reference area is set at two places corresponding to a starting position and corresponding to a terminating position, and a calibration value of each measuring element at each measuring position from the place corresponding to the starting position to the place corresponding and a terminating position is acquired at the two places, and a calibration value of each measuring element at each measuring point between the place corresponding to a starting position to the place corresponding and a terminating position is acquired based upon the calibration value of each measuring element acquired at the two positions.

Similarly, according to a sixth aspect of the present invention, there is provided the method for calibrating unevenness of a plurality of measuring elements in the apparatus for evaluating road surface properties according to any one of the first to fifth aspect, wherein a flat plate is disposed on the reference area.

Similarly, according to a seventh aspect of the present invention, there is provided a method for evaluating road surface properties including the method for calibrating unevenness of a plurality of measuring elements in the apparatus for evaluating road surface properties according to any one of the first to sixth aspects, wherein each measuring element is calibrated based upon the calibration value to perform evaluation of the road surface.

Similarly, according to an eighth aspect of the present invention, there is provided an apparatus for evaluating road surface properties provided with a plurality of measuring elements emitting measuring light and receiving reflected light for performing evaluation by scanning a road surface by the plurality of measuring elements and measuring a separation quantity from a reference plane of the road surface while the apparatus for evaluating road surface properties being moved along a measurement route of the road surface, comprising:

a means for setting a reference area for performing the calibration and a provisional reference plane on the reference area;

a means for acquiring a measurement value obtained by each measuring element regarding the reference area;

a means for producing point cloud data on a separation quantity of the each point from the provisional reference plane on the reference area regarding the reference area;

a means for producing a reference plane for calibration based upon a statistic of the point cloud data acquired from all of the measuring elements;

a means for computing a separation quantity from the reference plane for calibration of the statistic about all of the measuring elements;

a means for determining a measuring element where the separation quantity is maximum of from among all of the measuring elements;

a means for calibrating the measuring element so as to make a difference between point cloud data produced from a measurement value of the measuring element where the separation quantity is maximum and the reference plane for calibration less than a predetermined threshold;

a means for producing a new reference plane for calibration from measurement values obtained by all the measuring elements including the calibrated measuring element; and a means for determining a final calibration value of each measuring elements by repeating computing a separation quantity from the reference plane for calibration of the statistic regarding all of the measuring elements, determining a measuring element where the separation quantity is maximum from among all the of the measuring elements, calibrating the measuring element so as to make a difference between point cloud data produced from a measurement value of the measuring element where the separation quantity is maximum and the reference plane for calibration equal to or less than a predetermined threshold, and producing a new reference plane for calibration from all of the measuring elements including the calibrated measuring element until the separation quantities from the reference plane for calibration of the point cloud data obtained by all of the measuring elements become smaller than a predetermined reference value.

According to a ninth aspect of the present invention, an apparatus for evaluating road surface properties provided with the apparatus for evaluating road surface properties according to the eighth aspect, wherein evaluation is performed based upon the calibration value.

According to the evaluating method of road surface properties and the evaluating apparatus of road surface properties according to the present invention, variations of measurements of a plurality of measuring elements can be acquired rapidly by a simple process.

That is, according to the method for calibrating unevenness of a plurality of measuring elements in an apparatus for evaluating a road surface properties according to the first aspect and the apparatus for evaluating road surface properties according to the eighth aspect, the following process is performed for calibrating unevenness of a plurality of measuring elements in the apparatus for evaluating road surface properties provided with the plurality of evaluating elements for emitting measuring light and receiving reflected light for performing evaluation by scanning a road surface with the plurality of measuring elements and measuring while the apparatus for evaluating road surface properties is being moved along a measurement route of the road surface to measure a separation quantity from a reference plane of the road surface and measuring. That is, a step of setting a reference area for performing calibration and a provisional reference plane in the reference area, a step of acquiring a measurement value by each measuring element regarding the reference area, a step of producing point cloud data on a separation quantity of each point from the provisional reference plane of the reference area regarding the reference area, a step of producing a reference plane for calibration based upon a statistic of point cloud data acquired from all of the measuring elements, and a step of computing a separation quantity from the reference plane for calibration of the statistic regarding all of the measuring elements are performed. Then, a step of computing separation quantities from the reference plane for calibration of the statistic regarding all of the measuring elements, a step of determining a measuring element where the separation quantity is maximum from among all of the measuring elements, a step of calibrating the measuring element so as to make a difference between the point cloud data produced from a measurement value of the measuring element where the separation quantity is maximum and the reference plane for calibration equal to or less than a predetermined threshold, and a step of producing a new reference plane for calibration from all of the measuring elements including the calibrated measuring element are repeated until the separation quantities from the reference plane for calibration regarding the point cloud data acquired from all of the measuring elements become smaller than a predetermined reference value. Thereby, a calibration value of each measuring element obtained when the separation quantities from the reference plane regarding the point cloud data acquired from all of the measuring elements become smaller than the predetermined reference value is determined as a final calibration value. Therefore, calibration values of all the measuring elements can be acquired simply and rapidly.

Further, according to the method for calibrating a plurality of measuring elements in the apparatus for evaluating road surface properties according to the second aspect, when a provisional reference plane for the reference area is set, it is confirmed that a separation value at each measuring point from a fitting plane produced from measurement values acquired in the reference area measured by one measuring element selected from the plurality of measuring elements is smaller than a predetermined specified value. Therefore, a reference area having a predetermined flatness can be set in a road surface to be measured.

Further, according to the method for calibrating a plurality of measuring elements in the apparatus for evaluating road surface properties according to the third aspect, the reference area is set at a specific place in the measurement route of a road surface to be measured. Therefore, the reference area can be set in the measurement route of the road surface, and the calibration value of each measuring element can be acquired in a timely manner when measurement is performed.

Further, according to the method for calibrating a plurality of measuring elements in the apparatus for evaluating road surface properties according to the fourth aspect, the reference area is set at least one of a place corresponding to a starting position of the measurement route and a place corresponding to a terminating position thereof. Therefore, the calibration is performed based upon at least one of the position at the starting time of the measurement and the position at the terminating time thereof.

Further, according to the method for calibrating a plurality of measuring elements in the apparatus for evaluating road surface properties according to the fifth aspect, the reference area is set at the two places of the location corresponding to the starting position and the location corresponding to the terminating position, and the calibration value of each measuring element at each measuring position between the starting point and the terminating point is acquired based upon the calibration values of each measuring element acquired at the two places. Therefore, more accurate measurement and evaluation of the road surface can be performed by acquiring the calibration value of each measuring element at each measuring position on the measurement route and interpolating the calibration value from the starting point to the terminating point.

Further, according to the method for calibrating a plurality of measuring elements in the apparatus for evaluating road surface properties according to the sixth aspect, a flat plate is disposed on the reference area. Therefore, the reference area can be made flat with a high degree of accuracy, and each measuring element can be accurately calibrated.

Further, according to the method for evaluating road surface properties according to the seventh aspect and the apparatus for evaluating road surface properties according to the ninth aspect, calibration of the measuring elements is performed, and evaluation of the road surface is performed by calibrating each measuring element based upon the calibration values. Therefore, more accurate evaluation of the road surface properties can be performed by the calibrated measuring element.

BRIEF DESCRIPTION OF THE DRAWINGS

FIGS. 2A and 2B are schematic diagrams showing a measuring state of a road surface performed by a road surface measuring apparatus, FIG. 2A being a side diagram and FIG. 2B being plan diagram;

FIGS. 12A to 12F are schematic diagrams showing a state of calibration of a measuring element in the method for evaluating road surface properties according to the embodiment of the present invention.

DETAILED DESCRIPTION

Figure 1:
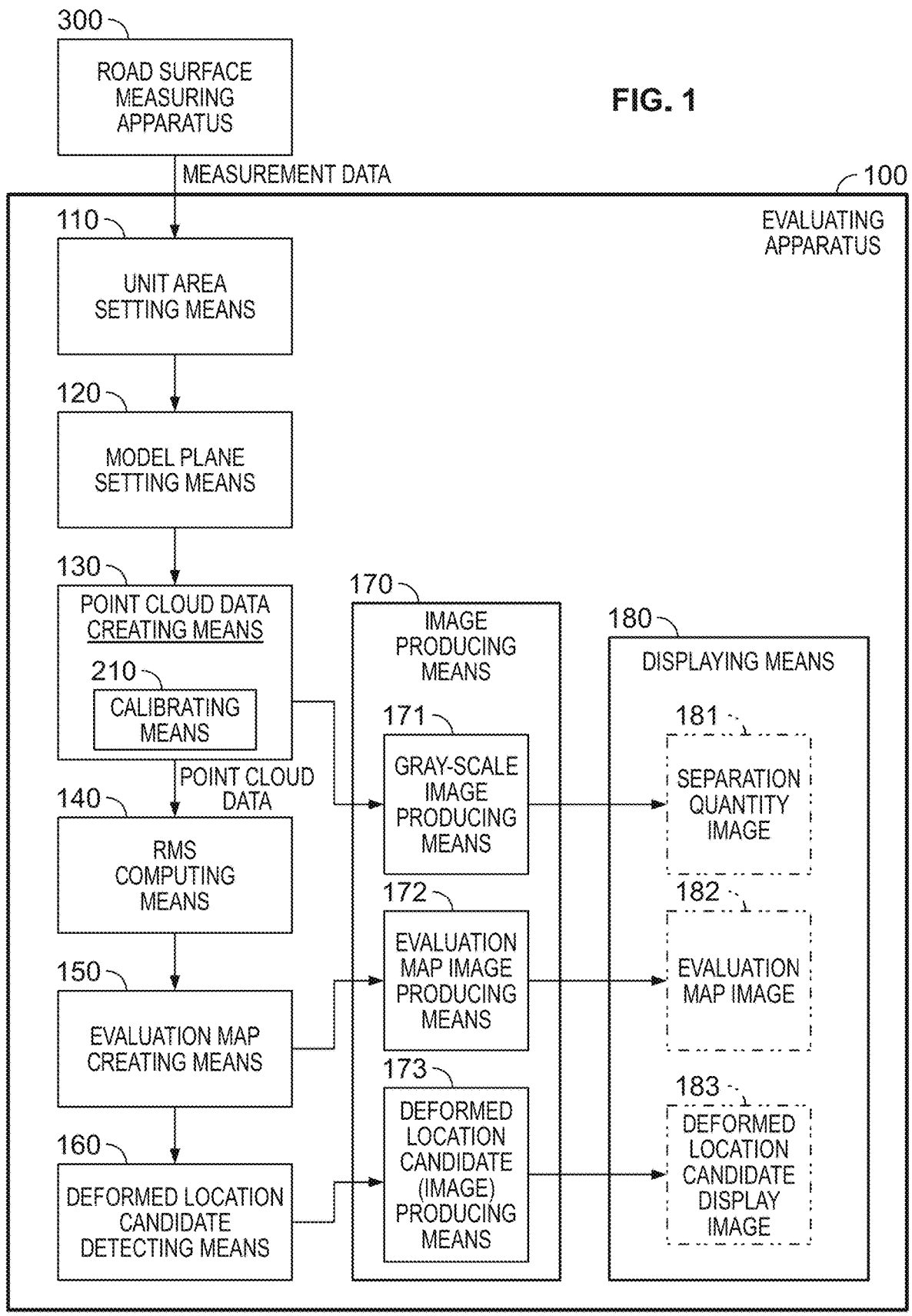
FIG. 1 is a block diagram showing a configuration of an apparatus for evaluating road surface properties according to an embodiment of the present invention.

A method for calibrating unevenness of a plurality of measuring elements and a method for evaluating road surface properties, and an apparatus for evaluating road surface properties according to an embodiment of the present invention will be explained.

The method for evaluating road surface properties, and the apparatus for evaluating road surface properties according to the embodiment of the present invention are configured so as to move a road surface measuring apparatus constituting an MMS (Mobile Mapping System) along a measurement route of a road surface, evaluate measurement data in a planar manner regarding a separation quantity (a height) from a measurement reference plane on the road surface acquired through the movement, and perform evaluation of the road surface properties. The road surface measuring apparatus is mounted on a running vehicle to acquire high accurate actually-measured data with a high accuracy using a scanner and an image. Specifically, in each target unit area (for example, 2 m×3 m (for example, a lane width) along a vehicle running lane, a model plane is set using a point cloud in a region having a predetermined width dimension and having no vehicle traffic and thus expected not to have a rut, for example a route side. It should be noted that two regions used for the setting are not limited to both the edges. Alternatively, a vicinity of the center of a vehicle width or a paint of a lane marker point can be used.

Point cloud data which is separation quantity from the model plane is computed regarding all points within a target unit area. Further, a representative value symbolizing each unit area is obtained as an evaluation value by processing the separation quantities at all the points in the unit area statistically to compute RMS (Root Mean Square) as a statistic. It should be noted that when the measurement data is acquired, the orientation of the vehicle during the measurement is taken into consideration in the road surface measuring apparatus, and therefore area discrimination along the running route or the like can be performed automatically without needing a decision or work performed by a person. Further, a lane marker used as the above-described two regions can be extracted by measuring luminance of the road surface at the measuring time. In addition, curb portions at both edges of a road is extracted from a normal line of the road surface, lower edges of curb regions at the both ends of the road are extracted, lower (low elevation) edges of the curb regions at the both ends of the road is acquired, and a face can be determined so as to include the edges at both the ends of the road. Precise measurement is performed based upon information on the road surface properties acquired in this manner.

Further, in the method for evaluating road surface properties and the apparatus for evaluating road surface properties according to this embodiment, a calibration value is obtained by applying the embodiment of the method for calibrating a measuring element according to the present invention to calibrate the measuring element of the road surface measuring apparatus. In this embodiment, a plurality of measuring elements are arranged in the measuring apparatus. In order to eliminate unevenness of measurements, each measuring element is calibrated at the manufacturing time or at the shipping time (for example, the unevenness is 1 cm), but in this embodiment, the degree of the unevenness is further reduced (for example, the unevenness is in a range from 2 mm to 3 mm). Therefore, all the measuring elements are calibrated based upon point cloud data of a reference area acquired at the measuring time again. The reference area can be set, for example, at a specific place such as a starting place of a measuring route, or a terminating place thereof, or at an arbitrary place.

It is desirable that the reference area is a flat surface which does not include roughness, so that a flat place on the road surface is selected and set. Further, in this embodiment, measurement of a candidate of a selected reference area is performed to confirm the flatness. When the flatness satisfies a predetermined condition, the candidate is set as the reference area. It should be noted that a flat plate which has been laid on the road surface can be set as the reference area.

Further, it is desirable that when a region including the reference area is measured, a measuring vehicle runs at a velocity (for example, 10 km/h) lower than a velocity at a normal measuring time (for example, 30 to 40 km/h). Thereby, accurate calibration can be performed.

The calibration is performed at a starting point of the measuring route, and application of a calibration value of each measuring element can be applied on a real-time basis to measurement data which is being acquired while the measuring vehicle is running on the measuring route. Further, the calibration value of each measuring element can be applied to the acquired point cloud data after termination of the measurement. In addition, a time-dependent change of each measuring element at each measuring position on the measuring route can be grasped by performing calibrations at a place corresponding to the starting position of the measurement and a place corresponding to the terminating position thereof, so that a time-dependent calibration can be performed.

In the method for calibrating a measuring element in the apparatus for evaluating road surface properties according to this embodiment, a process such as acquirement of point cloud data performed by the measuring element, acquisition of a separation quantity from the reference plane, and the like is performed. Therefore, a configuration and a process of an apparatus for evaluating road surface property performing a similar process will be first described, and calibration of a measuring element in the apparatus for evaluating road surface properties will be then described.

The apparatus for evaluating road surface properties will be described below. FIG. 1 is a block diagram showing a configuration of the apparatus for evaluating road surface properties according to an embodiment of the present invention. An apparatus for evaluating road surface properties 100 according to the embodiment of the present invention produces point cloud data based upon a measurement result of a road surface measuring apparatus 300 and performs evaluation of the road surface properties and produces a depression candidate image.

The road surface measuring apparatus 300 is a known one. It should be noted that evaluation of the road surface properties can be performed approximately simultaneously with scanning of the road surface if the evaluating apparatus 100 is preliminarily mounted on the vehicle together with the road surface measuring apparatus 300.

FIGS. 2A and 2B are schematic diagrams showing a measuring state of a road surface performed by the road surface measuring apparatus, FIG. 2A being a side diagram, and FIG. 2B being a plan diagram. As shown in FIG. 2A, the road surface measuring apparatus 300 is mounted on a vehicle 340 running on a road 400. The road surface measuring apparatus 300 is provided with a scanner 310 which is a measuring apparatus, an omni-direction camera 320, a laser pointer 330, a GNSS (Global Navigation Satellite System) apparatus, an orientation detecting apparatus for the road surface measuring apparatus 300, an accelerometer and the like. The road surface measuring apparatus 300 performs irradiation of scanning light La in a spiral manner diagonally in front of the vehicle 340 by the scanner 310 while acquiring the position by the GNSS apparatus and receives reflected light Lb from the road 400.

The measurement data of the road 400 is acquired based upon a time taken before the reception. Therefore, a locus T of the scanning light La on the road 400 has a circular arc shape as shown in FIG. 2B. A plurality of measuring elements are arranged in the scanner 310. The measuring element is provided with a light-emitting element and a light-receiving element, and measuring light is emitted in a pulse-like manner from the light-emitting element and reflection of the measuring light from the road surface is received by the light-receiving element.

Further, the road surface measuring apparatus 300 simultaneously acquires an omni-directional road image by the omni-directional camera 320. The laser pointer 330 irradiates the road surface with visible laser light in a scanning manner, and projects and displays a depression detection mark described later around a depression candidate on the road.

Figure 3A:
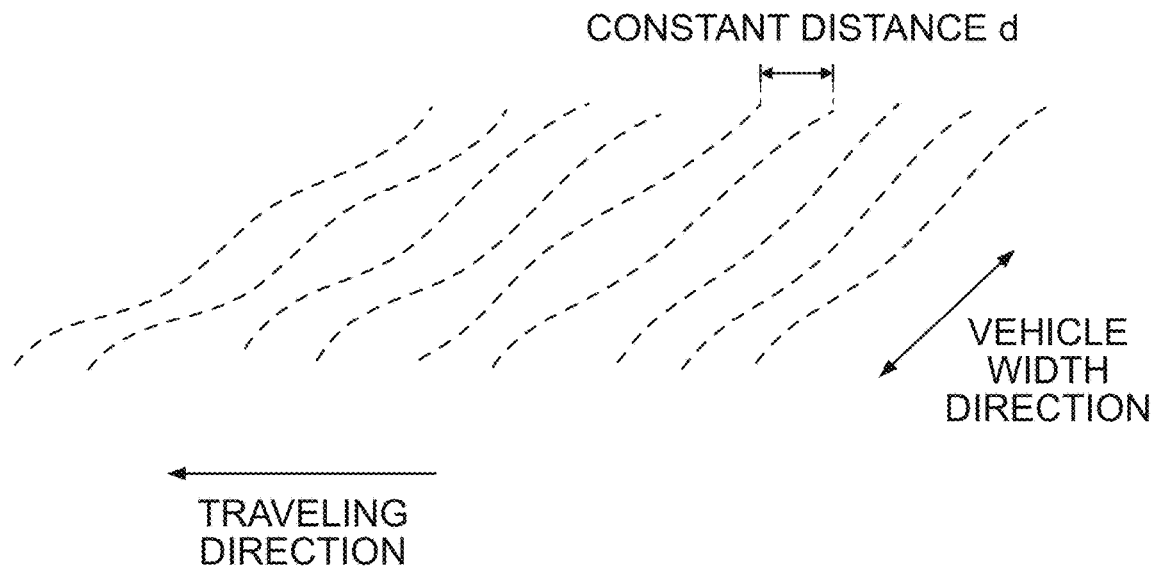
FIGS. 3A and 3B are schematic diagrams showing outline of measurement data, FIG. 3A being a perspective diagram of the measurement data and FIG. 3B being a schematic diagram showing measurement data and a measurement reference plane.
Figure 3B:
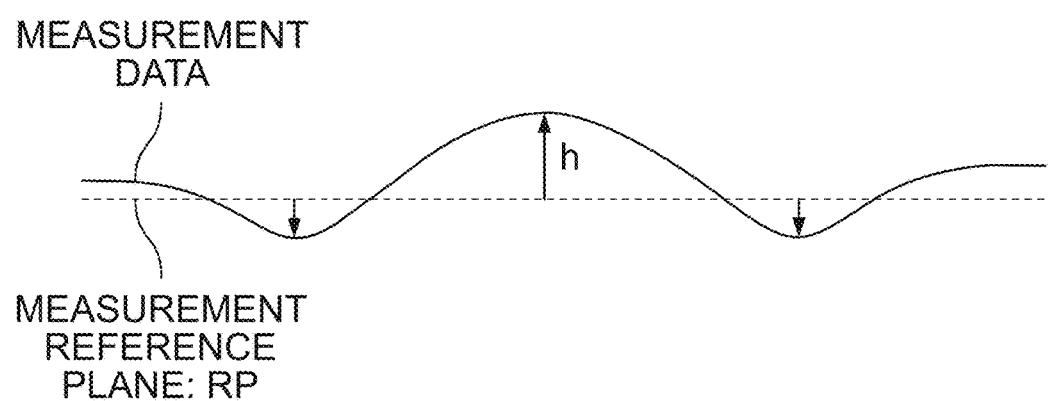

FIGS. 3A and 3B are schematic diagrams showing the outline of the measurement data measured, FIG. 3A being a perspective diagram of the measurement data and FIG. 3B being a schematic diagram showing the measurement data and a measurement reference plane. The road surface measuring apparatus 300 is equipped with the GNSS apparatus for acquiring its own position, the orientation detecting apparatus for the road surface measuring apparatus 300, the accelerometer, and the like, and acquires measurement data of each point on a plurality of loci of the scanning light La separated from each other by a constant distance "d" on the road 400, as shown in FIG. 3A. It should be noted that the measurement data represents a separation quantity "h" from a measurement reference plane (for example, a geoid surface) RP set by the road surface measuring apparatus 300, as shown in FIG. 3B.

As shown in FIG. 1, the evaluating apparatus 100 acquires the measurement data from the road surface measuring apparatus 300 to produce point cloud data and evaluate the road surface properties. The evaluation apparatus 100 is provided with a unit area setting means 110, a model plane computing means 120, point cloud data producing means 130, an RMS computing means 140, evaluation map producing means 150, a deformation location candidate detecting means 160, an image producing means 170, and a displaying means 180. In the evaluating apparatus 100 according to this embodiment, element calibrating means 210 is provided in the point cloud producing means 130 in order to calibrate the measuring elements in the scanner 310.

The evaluating apparatus 100 is configured as a computer provided with a CPU (Central Processing Unit) serving as a processor, a RAM (Random Access Memory) serving as a main storage apparatus, HDD (Hard Disc Drive) serving as an auxiliary storage apparatus, and the like, where functions of the unit area setting means 110, the model plane computing means 120, the point cloud data producing means 130, the evaluation map producing means 150, the deformation location candidate detecting means 160, the image producing means 170, and the element calibrating means 210 are realized by the CPU carrying out a program.

Figure 4A:
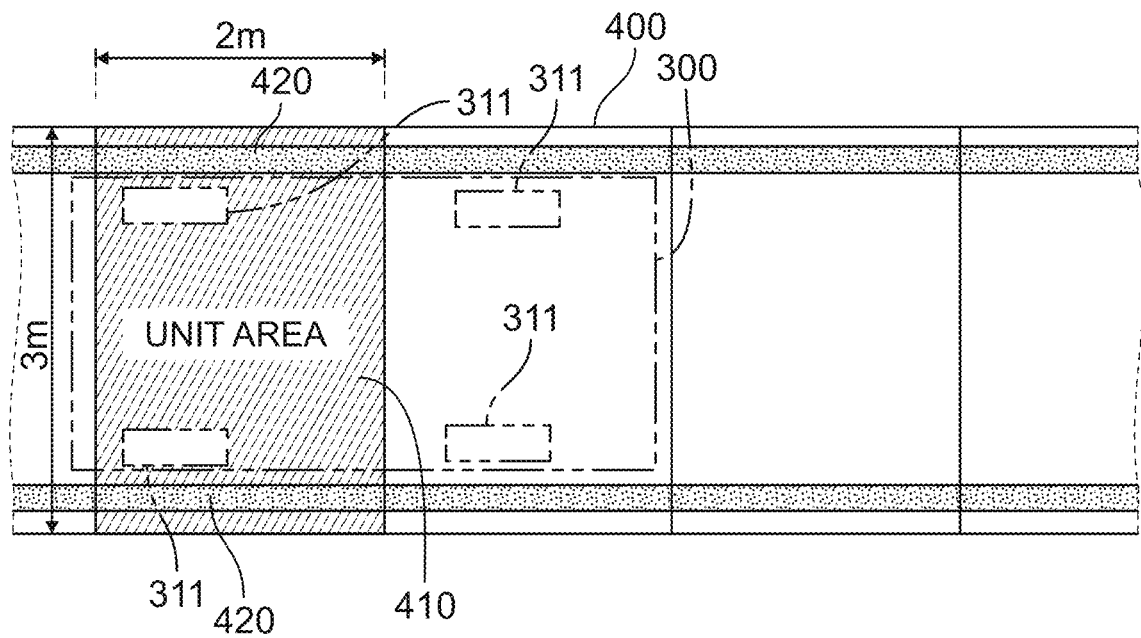
FIGS. 4A and 4B show an acquired state of point cloud data in a unit area, FIG. 4A being a schematic diagram showing the unit area and FIG. 4B being a schematic diagram showing the the point cloud data and a model plane MP.
Figure 4B:
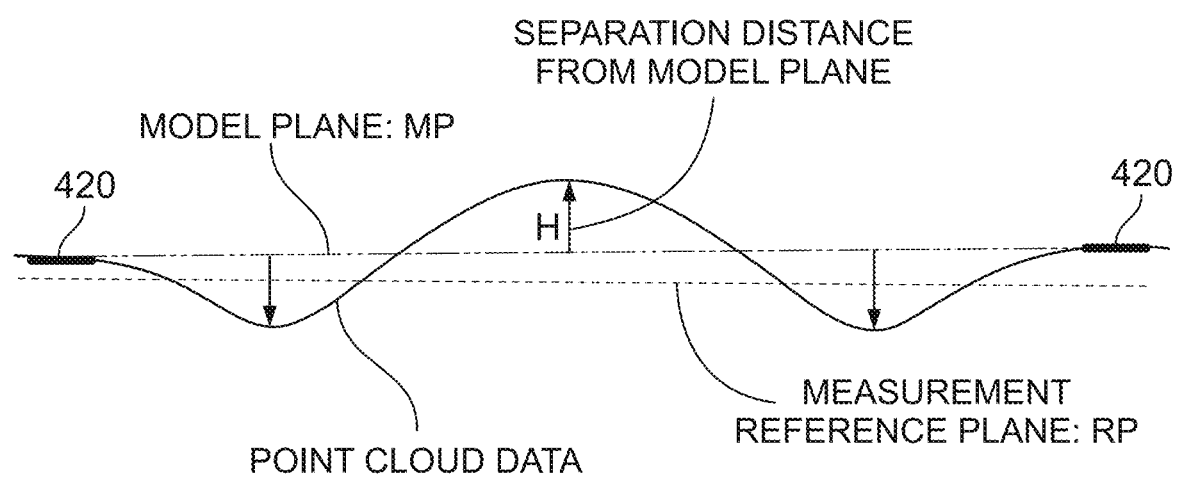
Figure 5:
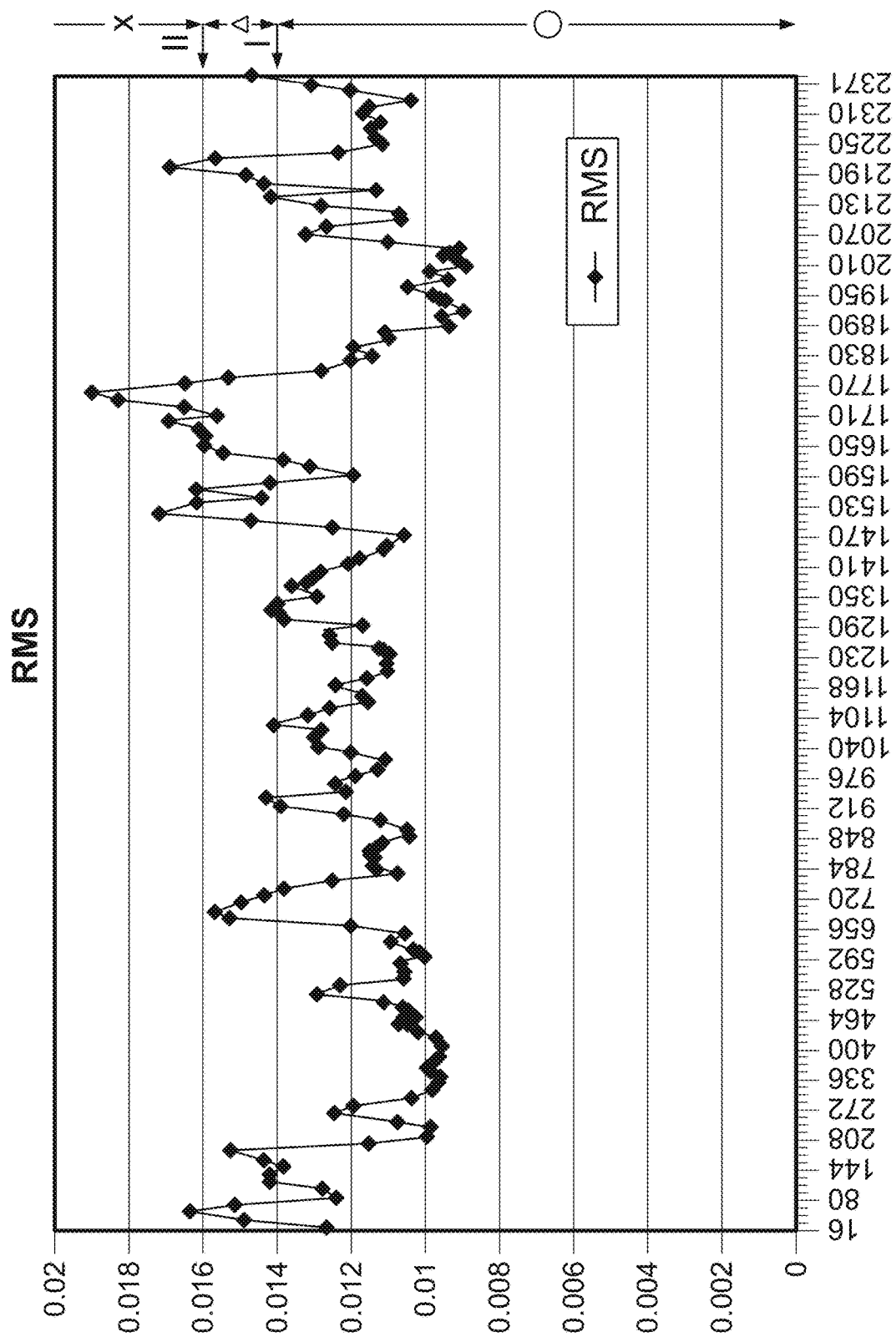
FIG. 5 is a graph showing a change of RMS values on a measurement route.

The unit area setting means 110 sets along the route a unit area having a length dimension preset along the route in the width of the road. FIGS. 4A and 4B show an acquired state of the point cloud data in the unit area, FIG. 4A being a schematic diagram showing a unit area and FIG. 4B being a schematic diagram showing point cloud data and a model plane MP. A shown in FIG. 5A, the unit area setting means 110 divides the road 400 to be measured into unit areas 410 having a width of 3 m and a length of 2 m, for example. Here, a width dimension can be set based upon the width of one lane of the road, a distance from one road shoulder to the other road shoulder, the width of a vehicle used for measurement, and the like. Further the length distance can be properly set to not only 2 m but also another dimension, but when the length dimension is excessively long, computation such as setting of the model plane MP or the like becomes complicated, and in addition a gap between the model plane MP and the road surface properties may become large.

The model plane computing means 120 sets the model plane MP in the unit area 410 based upon the measurement data which is a separation quantity from the measurement reference plane of each of the measurement points in the unit area 410. The model plane MP is set on the basis of a plurality of regions spaced along the road width, two regions in this embodiment, for example, reference regions 420 which are regions having a width of 20 cm and located at a predetermined distance (for example, 20 cm) outside from wheels 341 of the vehicle 340, as shown in FIG. 4A. Specifically, the model plane MP can be obtained from many point clouds belonging to the reference regions 420 by utilizing a least-squares method.

It should be noted that the number of the reference regions is not limited to two, and it may be three or more such as three regions: a central region and regions on both end sides. As the reference region, a region having an interval dimension and a width dimension and expected to have no damage or rut due to the vehicle traffic, for example, a point cloud on the route end a vicinity of a center of a vehicle width, or one lane marker paint can be used. It should be noted that the lane marker can be acquired by measuring luminance of the road surface during the measurement performed by the road surface measuring apparatus 300.

As shown in FIG. 4B, the point cloud data producing means 130 computes a separation quantity "H" between the model plane MP and each point. Thereby, point cloud data is produced from the separation quantity of each point in the unit area 410.

Figure 6:
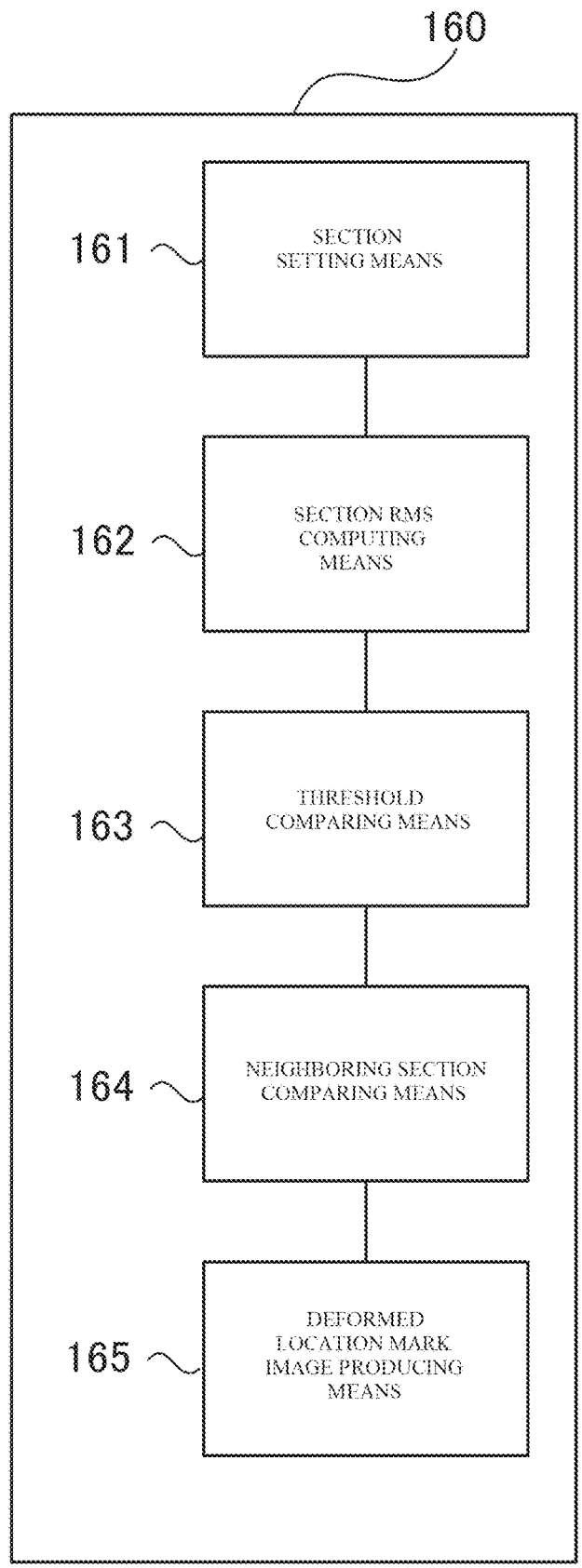
FIG. 6 is a block diagram showing a configuration of a deformation location candidate detecting means of the apparatus for evaluating road surface properties according to the embodiment of the present invention.

The RMS computing means 140 computes RMS (Root Means square) which is a statistic in the each unit area from the point cloud data obtained by the point cloud data producing means 130 in each unit area 410. FIG. 6 is a graph showing a change of the RMS values on the measurement route. The RMS value of each unit area is represented by the vertical axis, and the distance is represented by the horizontal axis. It should be noted that not only RMS but also another statistic can be used. Thereby, the distribution of the road surface properties on the route can be known.

Figure 8:
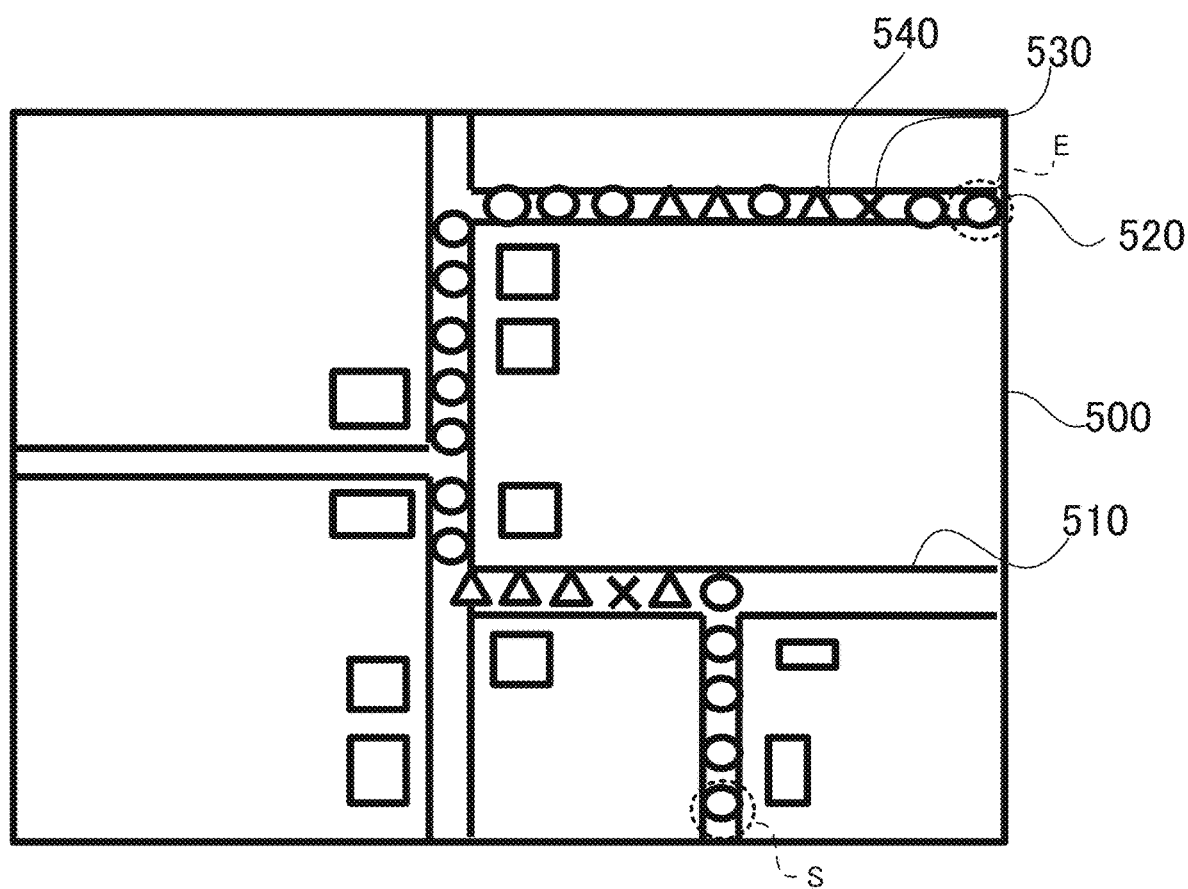
FIG. 8 is a schematic diagram showing an evaluation map.

The evaluation map producing means 150 performs evaluation of the road surface properties regarding each position on the road based upon the RMS values obtained by the RMS computing means 140 and allocates the evaluation result to the position on the road on the map. That is, in order to perform evaluation of the road surface properties from the RMS values shown in FIG. 5, for example, two values I and II (I<II) are set. The evaluation map producing means 150 determines that road surface properties are good (O), if the RMS value is less than the value I, or acceptable (Δ) if the RMS value is more than the value I and less than the value II, or not acceptable (X) if the RMS value is more than the value II. The evaluation result can be displayed on the road on the map, as shown in FIG. 8.

Figure 9A:
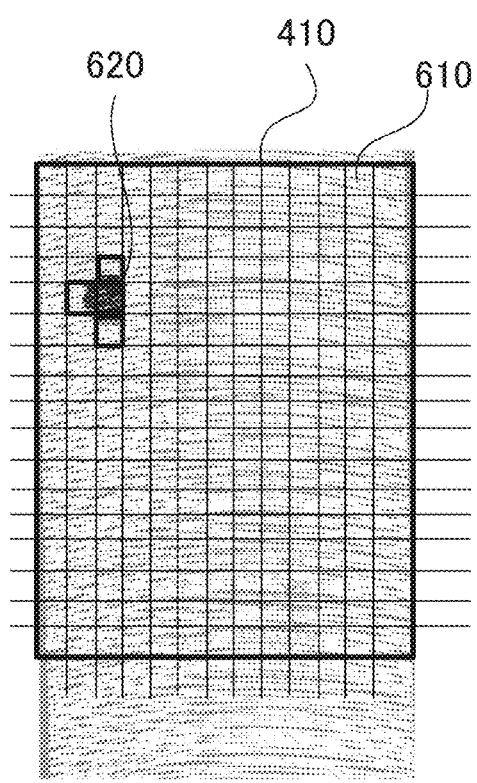
FIGS. 9A and 9B show detection of a deformation location candidate, FIG. 9A being a schematic diagram showing sections in the unit area, and FIG. 9B being a view showing display of a deformation location mark to a road surface performed by a laser pointer.
Figure 9B:
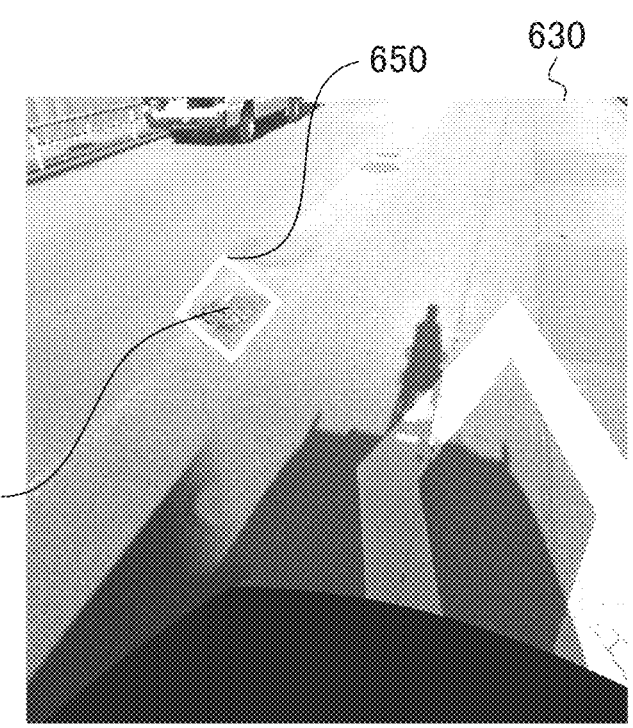

Next, the deformation location candidate detecting means 160 will be described. FIG. 6 is a block diagram showing a configuration of the deformation location candidate detecting means 160. The deformation location candidate detecting means 160 is provided with a section setting means 161, a section RMS computing means 162, a threshold comparing means 163, a neighboring section comparing means 164, and a deformation location detection mark producing means 165. FIGS. 9A and 9B show detection of a depression candidate, FIG. 9A being a schematic diagram showing sections in the unit area and FIG. 9B being a diagram showing mark display on a road surface performed by the laser pointer.

First of all, the unit area 410 is divided into a plurality of sections 610, 610, . . . , 610 by the section setting means 161. As shown in FIG. 9A, the unit area 410 is partitioned into a grid and thus divided into the sections 610, 610, . . . , 610 arranged regularly.

The section RMS computing means 162 computes RMS (Root Mean Square) as a statistic of the point cloud data belonging to each section to set the same as a representative value of each section. Then, the threshold comparing means 163 compares the representative value of each section with a predetermined reference value to extract a section satisfying the reference value.

Next, the neighboring section comparing means 164 obtains a difference between the extracted representative value of each section and the representative value of a section adjacent thereto and compares the difference with a predetermined threshold, thereby detecting a deformation location candidate. That is, when an absolute value of the difference between each section and the section adjacent thereto is larger than the threshold, the extracted section is selected as the deformation location candidate. According to the signs of the representative value and the difference, it is determined whether the section is a depression candidate or a bump candidate is made. It should be noted that, when sections each having a change amount larger than the threshold are adjacent to each other, determination is also made as the deformed location candidate. Here, a pot hole or the like can be the depression candidate, and a ridge formed between ruts or the like can be the bump candidate.

The image producing means 170 is provided with a gray-scale image producing means 171, an evaluation map image producing means 172, and a deformation location candidate image producing means 173. The gray-scale image producing means 171 produces gray-scale image data of the road surface based upon the separation quantity from the model plane MP produced at the point cloud data producing means 130. A rut or a roughness of the road can be visualized on the image of the road by the gray-scale image.

The evaluation map image producing means 172 produces a map image showing the evaluation of the road surface properties based upon the map data produced at the evaluation map producing means 150. Through this map image, evaluation of the road surface properties added to each spot on the road displayed on the map can be recognized easily.

The deformation location candidate image producing means 173 produces a deformation location detection mark as a location corresponding to a contour of a section constituting the depression candidate from the detection result of the deformation location candidate detecting means 160. Thereby, as shown in FIG. 9B, a deformation location detection mark 650 produced around a depression candidate image 640 of a road image 630 is displayed. In the example shown in FIG. 9A, a pot hole which is the depression is shown as the deformation location. It should be noted that, when the vehicle 340 equipped with the road surface measuring apparatus 300 has reached the vicinity of a depression candidate, a deformation location on the road surface can be irradiated and thus indicated by the laser pointer 330. It should be noted that the bump can be indicated similarly.

The displaying means 180 displays a separation quantity image 181 based upon the gray-scale image data from the gray-scale image producing means 171, an evaluation map 182 based upon the map data from the evaluation map image producing means 172, and a depression candidate display image 183 based upon the depression detection mark from the deformation location candidate image producing means 173.

Figure 7A:
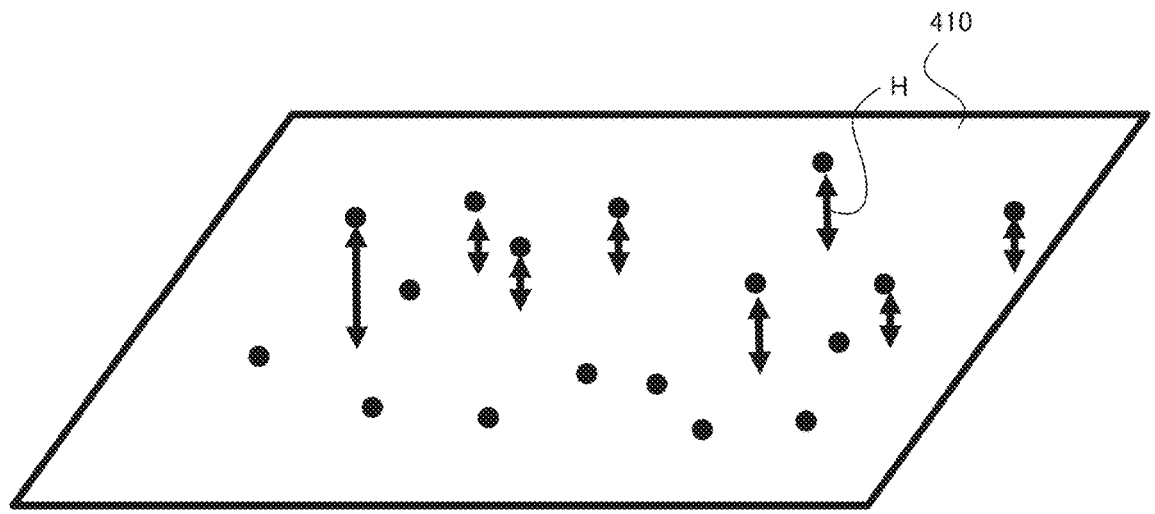
FIGS. 7A and 7B show a separation quantity image, FIG. 7A being a perspective schematic diagram showing a model plane MP and the point cloud data and FIG. 7B showing the separation quantity image.
Figure 7B:
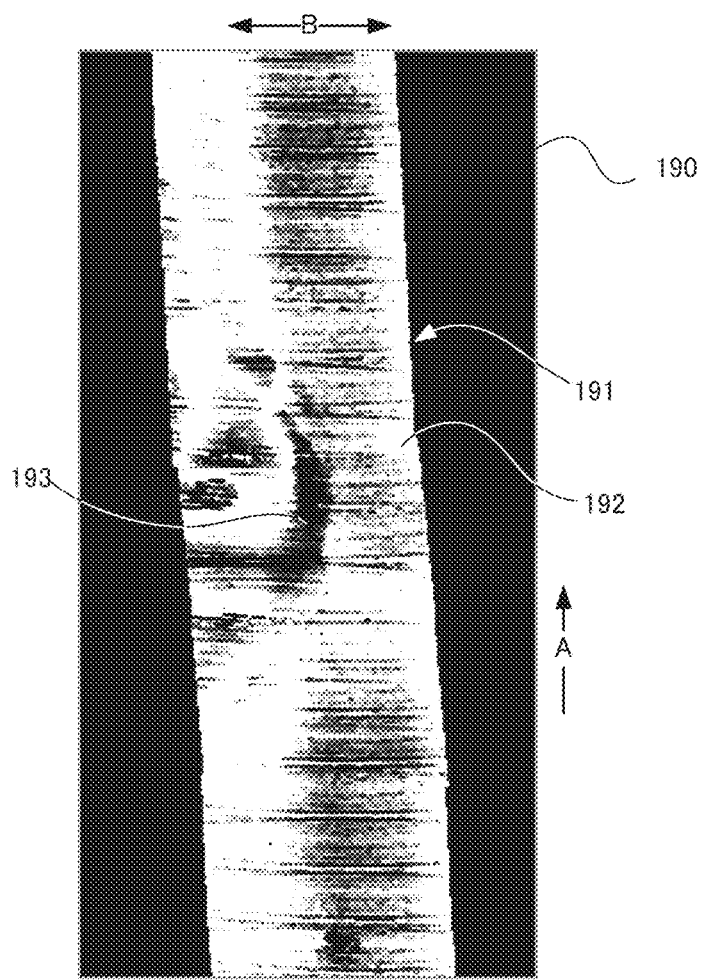

The separation quantity image 181 will be described. FIGS. 7A and 7B show a separation quantity image, FIG. 7A showing a perspective schematic diagram showing a model plane MP and point cloud data, and FIG. 7B being a diagram showing a separation quantity image. As shown in FIG. 7A, based upon a separation quantity (H) from the model plane MP at each point in the unit area 410, as shown in FIG. 7B, in the separation quantity image 190, the road 191 is displayed in shades of color based on the separation quantity at each point. It should be noted that the travelling directions along the width of the road 191 are indicated by arrow A in FIG. 7B and a width direction of the road 191 is indicated by arrow B in FIG. 7B. The separation quantity image 190 shown in FIG. 7B is displayed in gray scale, a location 192 higher than the model plane MP of the road 191 is displayed with white, a location 193 lower than the model plane MP is displayed in black, and a location there between is displayed in shades of gray. Thereby, the separation quantity from the model plane MP on the road can be recognized easily. Further, by applying a color image to the image, undulations can be understood more easily.

Next, the evaluation map 182 will be described. FIG. 8 is a schematic diagram showing an evaluation map. Map data produced by the evaluation map producing means 150 is visualized by the evaluation map image producing means 172 of the image producing means 170 and it is displayed on the displaying means 180 as the evaluation map 182. A representation "O" 520 indicating that the road surface properties are good, a representation "Δ" 530 indicating that the road surface properties are ordinary, and a representation "X" 540 indicating that the road surface properties are not acceptable are displayed to the road 510 displayed on the map image 500. Thereby, the evaluation result of the road surface properties can be recognized at a glance on the map.

It should be noted that the evaluating apparatus 100 can be mounted on the vehicle 340 equipped with the road surface measuring apparatus 300 to display the separation quantity image 181 or the evaluation map 182 immediately after data acquisition on the basis of the result acquired by the road surface measuring apparatus 300.

Figure 10:
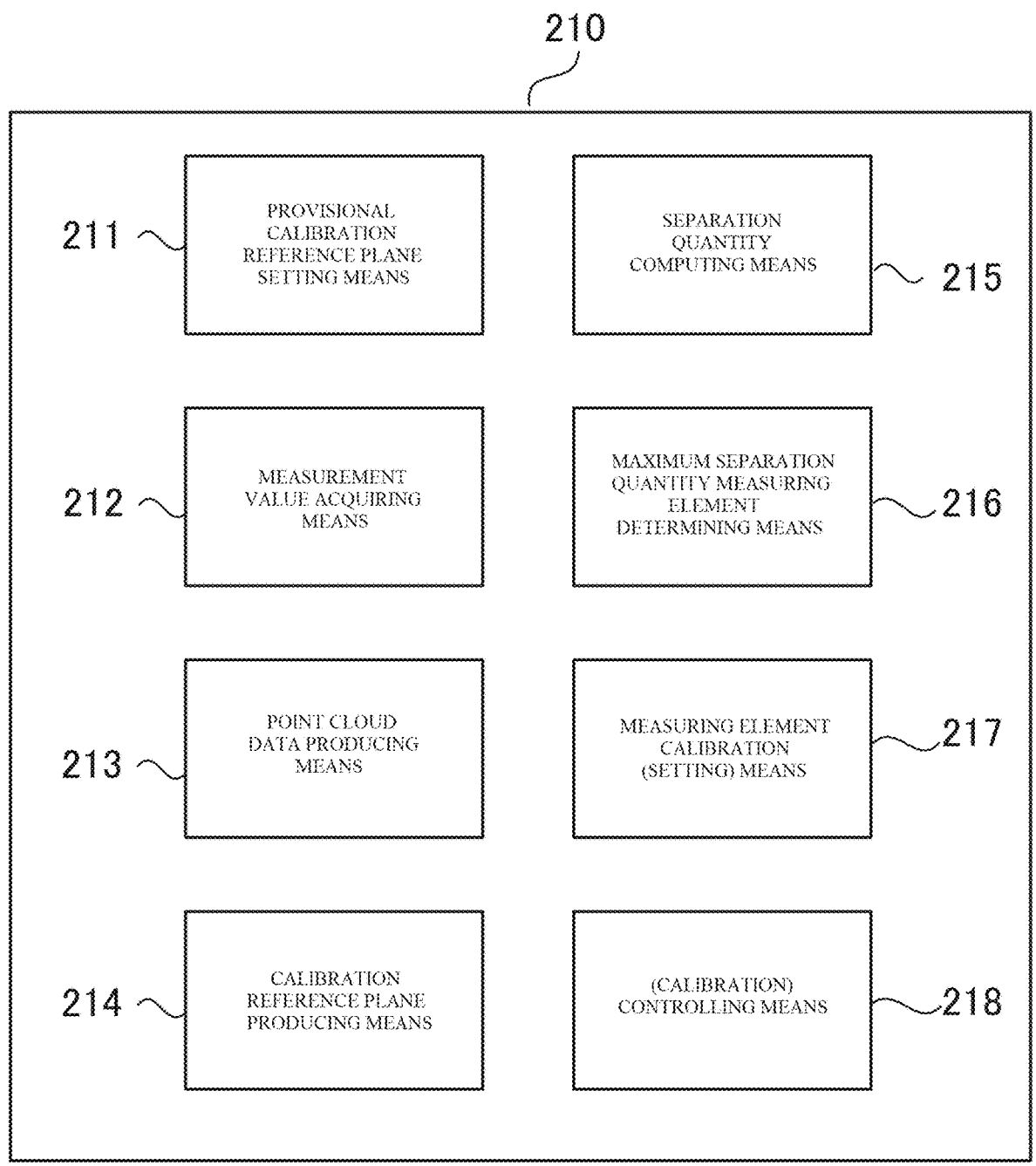
FIG. 10 is a block diagram showing a configuration of a measuring element calibrating means in the apparatus for evaluating road surface properties according to the embodiment of the present invention.

Next, the element calibrating means 210 will be described. FIG. 10 is a block diagram showing a configuration of a measuring element calibrating means in the road surface properties evaluation apparatus.

As shown in FIG. 10, the element calibrating means 210 is provided with a provisional reference plane setting means 211, a measurement value acquiring means 212, a point cloud data calibration producing means 213, a reference plane calibration producing means 214, a separation quantity computing means 215, a maximum separation quantity measuring element determining means 216, a measuring element calibration setting means 217, and a calibration controlling means 218.

The provisional reference plane setting means 211 sets a reference area for performing calibration and a provisional reference plane in the reference area. The reference area can be set on any place on the measurement route. For example, the reference area can be set at one or both of a place corresponding to a starting point of the measurement route (reference symbol S in FIG. 8) and a place corresponding to a terminating point thereof (reference symbol E in FIG. 8) or an intermediate location on the measurement route. The reference area is set so as to have a dimension of 1 m×1 m, for example. A flat road surface visually confirmed can be set as the reference area, or, a flat plate can be laid and set as the reference area.

The provisional reference plane in the reference area is set based upon point cloud data acquired by one measuring element of the plurality of measuring elements. A fitting plane is set according to a least-square method or the like from the point cloud data acquired by the one measuring element, and the separation quantities of the point cloud data from the fitting plane are statistically processed, and then, for example, if the RMS is equal to or less than a predetermined value, the fitting plane is set as the provisional reference plane.

The measurement value acquiring means 212 acquires a measurement value by each measuring element regarding the reference area. When calibration is performed after measurement of the road surface is terminated, a necessary measurement value is taken out of the stored measurement values. The point cloud data calibration producing means 213 produces point cloud data on the separation quantities of the measurement values of each measuring element from the provisional reference plane on the reference area.

The reference plane calibration producing means 214 statistically processes the point cloud data acquired from all of the measuring elements and produces a calibration reference plane. The separation quantities computing means 215 computes the separation quantity from the calibration reference plane regarding all the measuring elements.

The maximum separation quantity measuring element determining means 216 determines a measuring element where the separation quantity is maximum from among all the measuring elements. The measuring element calibration setting means 217 determines an offset amount of the measuring element so as to make a difference between the point cloud data produced from the measurement value of the measuring element where the separation quantity is maximum and the calibration reference plane equal to or less than a predetermined threshold.

The calibration controlling means 218 repeats computing the separation quantities from the calibration reference plane of a statistic regarding all of the measuring elements until the separation quantities from the calibration reference plane of the point cloud data obtained by all of the measuring elements become less than a predetermined reference value, determining a measuring element where the separation quantity is maximum from among all the measuring elements, determining an offset amount of the measuring element so as to make a difference between the point cloud data produced from the measurement value of the measuring element where the separation quantity is maximum and the calibration reference plane equal to or less than a predetermined threshold, and producing a new calibration reference plane from the measurement values of all the measuring elements including the measuring element calibrated.

When it is determined that the separation quantities from the reference plane of the point cloud data obtained by all of the measuring elements are been made smaller than a predetermined reference value, namely, when the RMSs of the separation quantities of all the measuring elements no longer change, or when the total of the separation quantities of all of the measuring elements became equal to or less than a predetermined value, the offset amount of each measuring element is determined as a final calibration value.

Figure 11A:
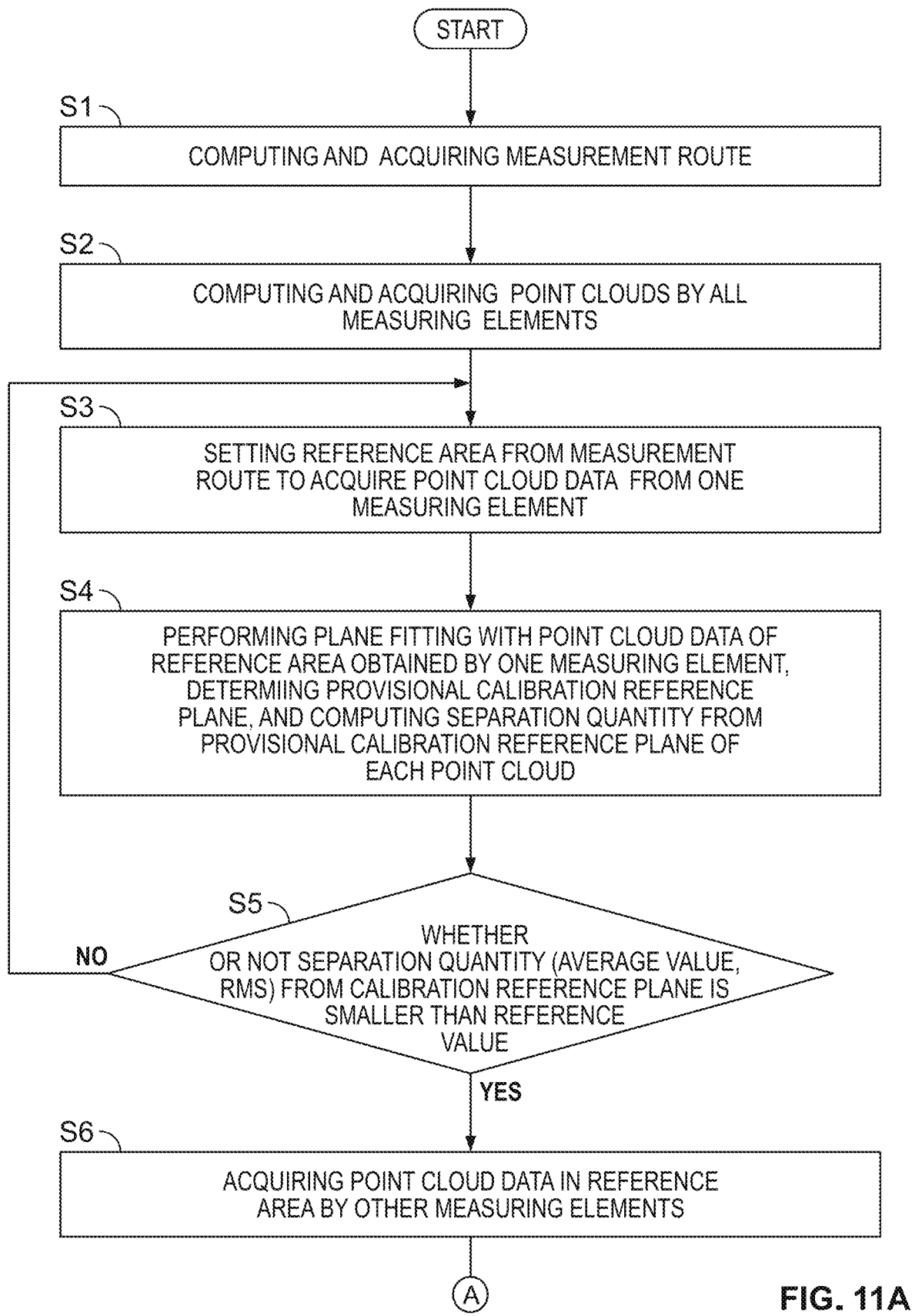
FIGS. 11A and 11B present a flowchart showing a procedure of calibrating the measuring elements in a method for evaluating road surface properties according to an embodiment of the present invention.
Figure 11B:
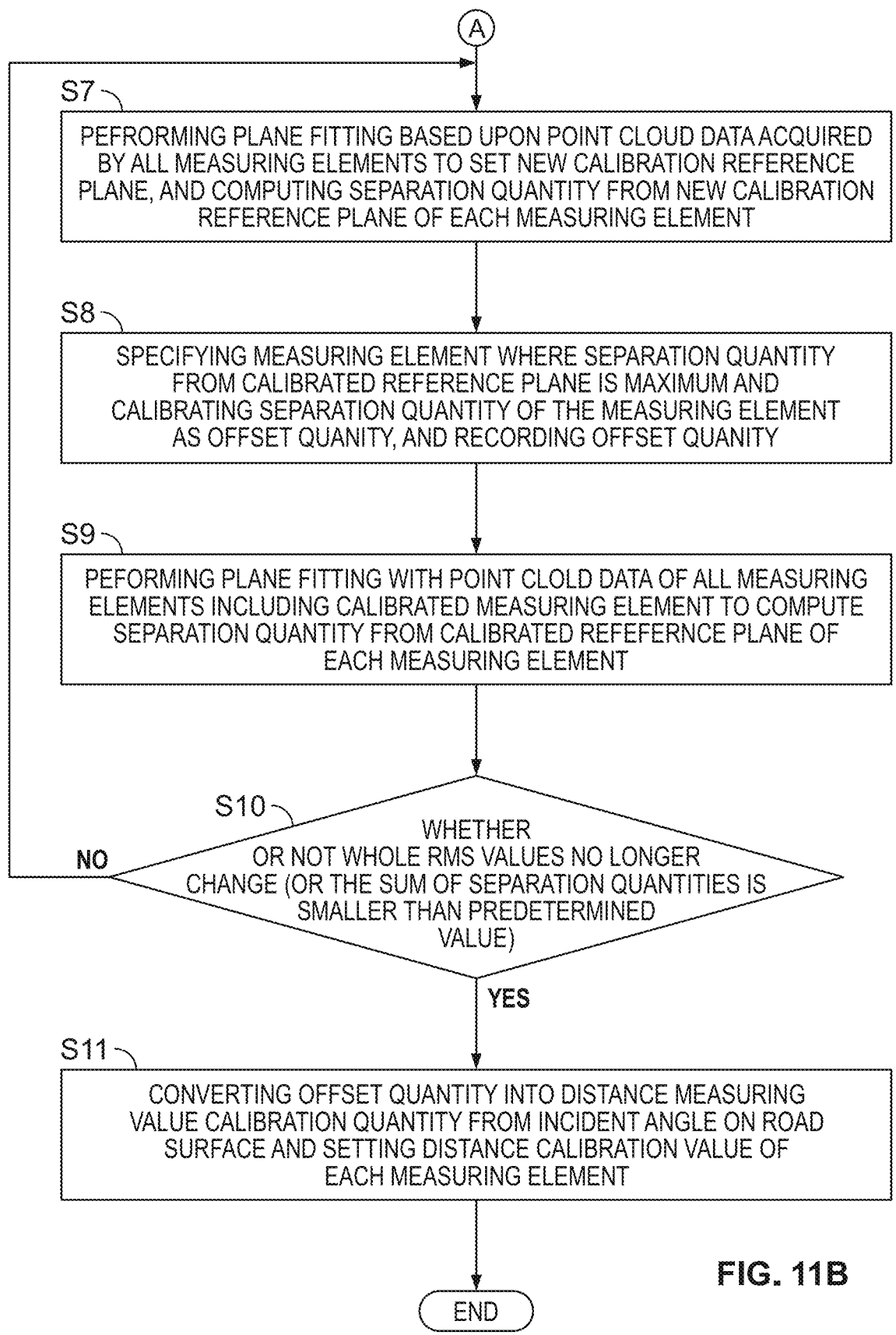

Next, the operation of the element calibrating means 210 will be described. FIGS. 11A and 11B present a flowchart showing a procedure for calibrating the measuring elements in the method for evaluating road surface properties according to an embodiment of the present invention, and FIGS. 12A to 12F are schematic diagrams showing states of calibration of the measuring elements in the method for evaluating road surface properties according to an embodiment of the present invention. It should be noted that cross sections of the calibration reference plane and the point cloud acquired by scanning performed by each measuring element are schematically described in FIGS. 12A to 12F.

In the method for evaluating road surface properties according to the embodiment, first the reference area used for calibration is first set. Therefore, a measurement route is acquired by computation (Step S1). The measurement route is acquired by the GNSS apparatus of the road surface measuring apparatus 300.

Next, the point clouds from all of the measuring elements are acquired by computation (Step S2). This example is based upon the assumption that measurements performed by all the measuring elements on the measurement route have been terminated. Further, one measuring element is selected from a plurality of measuring elements along a locus, and the point cloud acquired by this measuring element in the reference area used for calibration is cut out (Step S3).

Next, plane fitting is performed based upon the clipped point cloud, and the separation quantity at each point from the fitting plane is computed (Step S4). The separation quantity is acquired based upon the plurality of measurement values acquired in the reference area by the one measuring element.

Then, whether or not the separation quantity (average value: RMS) from the fitting plane is smaller than a predetermined reference value is determined (Step S5). When the separation quantity is smaller than the predetermined reference value (Yes at Step S5), the following processing is performed using the fitting plane as the provisional calibration reference plane. When the separation quantity is larger than the predetermined reference value (No at Step S5), selection of the reference area is repeated until the separation quantity becomes less than the reference value.

Next, the calibration of each measuring element is performed using the provisional calibration reference plane. First of all, a point cloud from another measuring element is acquired in the set reference area (Step S6).

Figure 12A:
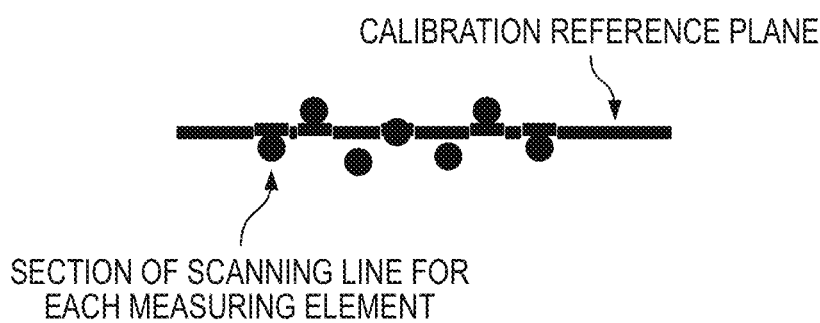

As shown in FIG. 12A, the plane fitting is performed by the point cloud of each measuring element acquired, and using this as a new calibration reference plane, the separation quantity of the measurement value of each measuring element is computed (Step S7).

Figure 12B:
Figure 12C:
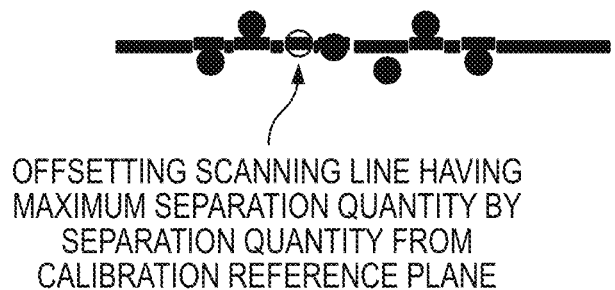

Next, as shown in FIG. 12B, a measuring element where the separation quantity from the calibration reference plane is maximum is detected, and as shown in FIG. 12C, the measurement value of the measuring element is offset by the separation quantity to coincide with the calibration reference plane. Further, the offset amount is recorded (Step S8).

In addition, as shown in FIG. 12D, the plane fitting is performed using the point clouds acquired at all the measuring elements including the offset measuring element and a new calibration reference plane is produced, and the separation quantity of each measuring element from the new calibration reference plane is computed (Step 9).

Whether or not RMS values from all the point cloud data no longer change regarding the separation quantities of all the measuring elements is determined (Step S10). It should be noted that this determination can be made based upon whether or not the total of the separation quantities is smaller than a predetermined specified value.

If the whole RMS values regarding the separation quantities of all the measuring elements no longer change (Yes at Step S10), the offset amount of each measuring element is determined, and thus the calibration is terminated. The offset amount is converted into a distance measuring value calibration quantity from an incident angle to the road surface, and the distance value calibration quantity is set as a distance measuring calibration value of each measuring element (Step S11).

When there is a change of the whole RMS about the separation quantities of all the measuring elements (NO at Step 10), as shown in FIGS. 12D and 12E, the processes in Step S7, Step S8, and Step S9 are repeated.

Thereby, unevenness of measurement values of a plurality of measuring elements is solved, and accurate evaluation can be performed by the apparatus for evaluating road surface properties.

The invention claimed is:

1. A method for calibrating a plurality of measuring elements in an apparatus for evaluating road surface properties, the apparatus being provided with the plurality of measuring elements for emitting measuring light and receiving reflected light, the apparatus performing evaluation by scanning a road surface with the plurality of measuring elements and measuring a separation quantity from a reference plane of the road surface while being moved along a measurement route of the road surface, the method determining a final calibration value of each of the measuring elements by performing the steps of:

setting a reference area for performing the calibration and a provisional reference plane of the reference area;

acquiring a measurement value obtained by each of the plurality of measuring elements regarding the reference area; and producing point cloud data based on the separation quantity of each point from the provisional reference plane of the reference area in the reference area and subsequently, until separation quantities from the reference plane for calibration of the point cloud data obtained by all the measuring elements become smaller than a predetermined reference value, repeating steps of:

computing the separation quantities from the reference plane for calibration based upon a statistic regarding all of the measuring elements;

determining a measuring element where the separation quantity is maximum from among all of the measuring elements;

determining a calibration value of the measuring element, the calibration value based on a difference between, point cloud data produced from the measurement value of the measuring element where the separation quantity is maximum, and the reference plane for calibration, the difference being equal to or less than a predetermined threshold;

calibrating the measuring element based on the calibration value; and producing a new reference plane for calibration from the measurement values of all of the measuring elements including the measuring element calibrated.

2. The method for calibrating a plurality of measuring elements in an apparatus for evaluating road surface properties according to claim 1, wherein, when the provisional reference plane of the reference area is set, it is confirmed that a separation quantity at each measuring point from a fitting plane produced from measurement values acquired in the reference area measured by one measuring element selected from the plurality of measuring elements is smaller than a predetermined specified value.

3. The method for calibrating a plurality of measuring elements in an apparatus for evaluating road surface properties according to claim 1, wherein the reference area is set at a specified place in the measurement route of the road surface to be measured.

4. The method for calibrating a plurality of measuring elements in the apparatus for evaluating road surface properties according to claim 1, wherein the reference area is set at least one of a place corresponding to a starting position of the measurement route and a place corresponding to a terminating position thereof.

5. The method for calibrating a plurality of measuring elements in the apparatus for evaluating road surface properties according to claim 4, wherein the reference area is set at two places corresponding to a starting position and corresponding to a terminating position, and a calibration value of each measuring element at each measuring point between the place corresponding to a starting position to the place corresponding and a terminating position is acquired based upon the calibration value of each measuring element acquired at the two positions.

6. The method for calibrating a plurality of measuring elements in the apparatus for evaluating road surface properties according to claim 1, wherein a flat plate is disposed on the reference area.

7. The method for calibrating a plurality of measuring elements in the apparatus for evaluating road surface properties according to claim 1, wherein each measuring element is calibrated based upon the calibration value.

8. An apparatus for evaluating road surface properties provided with a plurality of measuring elements emitting measuring light and receiving reflected light for performing evaluation by scanning a road surface by the plurality of measuring elements and measuring a separation quantity from a reference plane of the road surface while the apparatus for evaluating road surface properties being moved along a measurement route of the road surface, comprising:

a processor configured to:

set a reference area for performing a calibration and a provisional reference plane on the reference area;

acquire a measurement value obtained by each measuring element regarding the reference area;

produce point cloud data based on the separation quantity of each point from the provisional reference plane on the reference area regarding the reference area;

produce a reference plane for calibration based upon a statistic of the point cloud data acquired from all of the measuring elements;

compute a separation quantity from the reference plane for calibration of the statistic about all of the measuring elements;

determine a measuring element where the separation quantity is maximum from among all of the measuring elements;

calibrate the measuring element based on a difference between, point cloud data produced from a measurement value of the measuring element where the separation quantity is maximum, and the reference plane for calibration, the difference being less than a predetermined threshold;

produce a new reference plane for calibration from measurement values obtained by all the measuring elements including the calibrated measuring element; and adetermine a final calibration value of each of the plurality of measuring elements by repeating computing a separation quantity from the reference plane for calibration of the statistic regarding all of the measuring elements, determining a measuring element where the separation quantity is maximum from among all of the measuring elements, calibrating the measuring element based on a difference between, point cloud data produced from a measurement value of the measuring element where the separation quantity is maximum, and the reference plane for calibration, the difference being equal to or less than a predetermined threshold, and producing a new reference plane for calibration from all of the measuring elements including the calibrated measuring element until the separation quantities from the reference plane for calibration of the point cloud data obtained by all of the measuring elements become smaller than a predetermined reference value.

9. The apparatus for evaluating road surface properties provided with the apparatus for evaluating road surface properties according to claim 8, where evaluation of the road surface is performed based upon the final calibration value of each measuring element.

10. The method for calibrating a plurality of measuring elements in an apparatus for evaluating road surface properties according to claim 2, wherein the reference area is set at a specified place in the measurement route of the road surface to be measured.

11. The method for calibrating a plurality of measuring elements in the apparatus for evaluating road surface properties according to claim 2, wherein the reference area is set at least one of a place corresponding to a starting position of the measurement route and a place corresponding to a terminating position thereof.

12. The method for calibrating a plurality of measuring elements in the apparatus for evaluating road surface properties according to claim 3, wherein the reference area is set at least one of a place corresponding to a starting position of the measurement route and a place corresponding to a terminating position thereof.

13. The method for calibrating a plurality of measuring elements in the apparatus for evaluating road surface properties according to claim 2, wherein a flat plate is disposed on the reference area.

14. The method for calibrating a plurality of measuring elements in the apparatus for evaluating road surface properties according to claim 3, wherein a flat plate is disposed on the reference area.

15. The method for calibrating a plurality of measuring elements in the apparatus for evaluating road surface properties according to claim 4, wherein a flat plate is disposed on the reference area.

16. The method for calibrating a plurality of measuring elements in the apparatus for evaluating road surface properties according to claim 5, wherein a flat plate is disposed on the reference area.

17. The method for calibrating a plurality of measuring elements in the apparatus for evaluating road surface properties according to claim 2, wherein each measuring element is calibrated based upon the calibration value to perform evaluation of the road surface.

18. The method for calibrating a plurality of measuring elements in the apparatus for evaluating road surface properties according to claim 2, wherein each measuring element is calibrated based upon the calibration value to perform evaluation of the road surface and the road surface properties thereof.

19. The method for calibrating a plurality of measuring elements in the apparatus for evaluating road surface properties according to claim 3, wherein each measuring element is calibrated based upon the calibration value to perform evaluation of the road surface and the road surface properties thereof.

20. The method for calibrating a plurality of measuring elements in the apparatus for evaluating road surface properties according to claim 4, wherein each measuring element is calibrated based upon the calibration value to perform evaluation of the road surface and the road surface properties thereof.

* * * * *